United States Patent
Xue et al.

(10) Patent No.: US 10,496,758 B2
(45) Date of Patent: Dec. 3, 2019

(54) MACHINE TRANSLATION METHOD AND MACHINE TRANSLATION APPARATUS

(71) Applicant: Kabushiki Kaisha Toshiba, Minato-ku (JP)

(72) Inventors: Zhengshan Xue, Beijing (CN); Dakun Zhang, Beijing (CN); Jichong Guo, Beijing (CN); Jie Hao, Beijing (CN)

(73) Assignee: Kabushiki Kaisha Toshiba, Minato-ku (JP)

( * ) Notice: Subject to any disclaimer, the term of this patent is extended or adjusted under 35 U.S.C. 154(b) by 203 days.

(21) Appl. No.: 15/692,756

(22) Filed: Aug. 31, 2017

(65) Prior Publication Data

US 2018/0075022 A1  Mar. 15, 2018

(30) Foreign Application Priority Data

Sep. 13, 2016 (CN) .......................... 2016 1 0819758

(51) Int. Cl.
*G06F 17/28* (2006.01)

(52) U.S. Cl.
CPC ........ *G06F 17/289* (2013.01); *G06F 17/2818* (2013.01)

(58) Field of Classification Search
CPC ..... G06F 17/2827; G06F 17/28; G01L 15/26; G01L 15/18

(Continued)

(56) References Cited

U.S. PATENT DOCUMENTS 8,630,839 B2    1/2014 Ushioda
2004/0030551 A1*  2/2004 Marcu ................. G06F 17/2818
                                                      704/240

(Continued)

FOREIGN PATENT DOCUMENTS

JP          2010-33418 A       2/2010

OTHER PUBLICATIONS

Yasuda, T. et al., "Khofra: The SMT decoder based on the dynamic programming corresponding to a word order rearrangement model". The third cluster-of-colleges informatics of University of Tsukuba, University of Tsukuba graduate school system information engineering graduate course, 2010, (with unedited computer generated English translation), 12 pages.

(Continued)

*Primary Examiner* — Akwasi M Sarpong
(74) *Attorney, Agent, or Firm* — Oblon, McClelland, Maier & Neustadt, L.L.P.

(57) ABSTRACT

According to one embodiment, According to one embodiment, a machine translation apparatus includes a circuitry and a memory. The circuitry is configured to input a sentence of a first language, to segment the sentence to obtain a plurality of phrases, to search a translation model for translation options of a second language of each of the plurality of phrases, and to select top N translation options with high probabilities for decoding. N is an integer equal to or larger than 1. Furthermore, the circuitry is configured to combine the top N translation options of the plurality of phases to obtain a plurality of translation hypotheses, to search user history phrase pairs for the translation hypotheses, and to increase a score of a translation hypothesis existing in the user history phrase pairs. The memory is configured to store the score of the translation hypothesis.

12 Claims, 6 Drawing Sheets

(58) Field of Classification Search
USPC .................................... 704/2, 4, 240, 257
See application file for complete search history.

(56) References Cited

U.S. PATENT DOCUMENTS

| | | | | |
|---|---|---|---|---|
| 2004/0098247 A1* | 5/2004 | Moore | ............... | G06F 17/2818 704/4 |
| 2007/0043567 A1* | 2/2007 | Gao | ................. | G06F 17/2827 704/257 |
| 2007/0203688 A1* | 8/2007 | Fuji | ................. | G06F 17/28 704/2 |
| 2007/0282590 A1* | 12/2007 | Suzuki | ............... | G06F 17/274 704/2 |
| 2009/0222256 A1* | 9/2009 | Kamatani | ......... | G06F 17/2827 704/2 |
| 2013/0144594 A1* | 6/2013 | Bangalore | ......... | G06F 17/2836 704/2 |
| 2013/0226556 A1* | 8/2013 | Hwang | ............... | G06F 17/2818 704/2 |
| 2014/0006003 A1 | 1/2014 | Soricut et al. | | |
| 2014/0365201 A1* | 12/2014 | Gao | ................. | G06F 17/2818 704/2 |
| 2015/0347397 A1* | 12/2015 | Venkatapathy | ..... | G06F 17/2818 704/2 |

OTHER PUBLICATIONS

Aoki, M. et al., "Ranking attachment of the translation candidate in the English-Japanese translation by individual adaptation", Nagaoka University of Technology Electric system, 2006, (with unedited computer generated English translation), 15 pages.

Zhengxian Gong, et al. "Cache-based Document-level Statistical Machine Translation", Proceeding of the 2011 Conference on Empirical Methods in Natural Language Processing, 11 pages.

* cited by examiner

MACHINE TRANSLATION METHOD AND MACHINE TRANSLATION APPARATUS

CROSS-REFERENCE TO RELATED APPLICATION

This application is based upon and claims the benefit of priority from Chinese Patent Application No. 201610819758.7, filed on Sep. 13, 2016; the entire contents of which are incorporated herein by reference.

FIELD

The present invention relates to a machine translation method and a machine translation apparatus.

BACKGROUND

There are lots of machine translation (MT) systems currently. Some of them are Online MT systems, like Google MT, Baidu MT, Youdao MT, Systran, etc. Although the translation quality of these MT systems is not as good as expected, it is helpful for common translation requirements.

Inventors of the invention have found that, when we use an MT system to translate specialized documents, it is hard to get better translation results. The reason is that the existing statistical MT systems are all obtained based on a training corpus, and it is impossible to collect enough training corpus covering all domains or all possible sentences of human expression. So the existing statistical MT systems encounter some problems of better translation for in-domain and worse translation for out-of-domain. As to test set of in-domain, some fragments in training corpus can more or less hit fragments in test set or even hit a whole sentence. As to out-of-domain test set, almost no fragment can hit each other between training corpus and test set. This will produce a large number of OOVs (out of vocabulary) in decoding process. Based on this, the translation result of out-of-domain is very bad. Specialized documents generally belong to out-of-domain.

DETAILED DESCRIPTION

According to one embodiment, a machine translation apparatus includes a circuitry and a memory. The circuitry is configured to input a sentence of a first language, to segment the sentence to obtain a plurality of phrases, to search a translation model for translation options of a second language of each of the plurality of phrases, and to select top N translation options with high probabilities for decoding. N is an integer equal to or larger than 1. Furthermore, the circuitry is configured to combine the top N translation options of the plurality of phases to obtain a plurality of translation hypotheses, to search user history phrase pairs for the translation hypotheses, and to increase a score of a translation hypothesis existing in the user history phrase pairs. The memory is configured to store the score of the translation hypothesis.

<Machine Translation Method>

Figure 1:
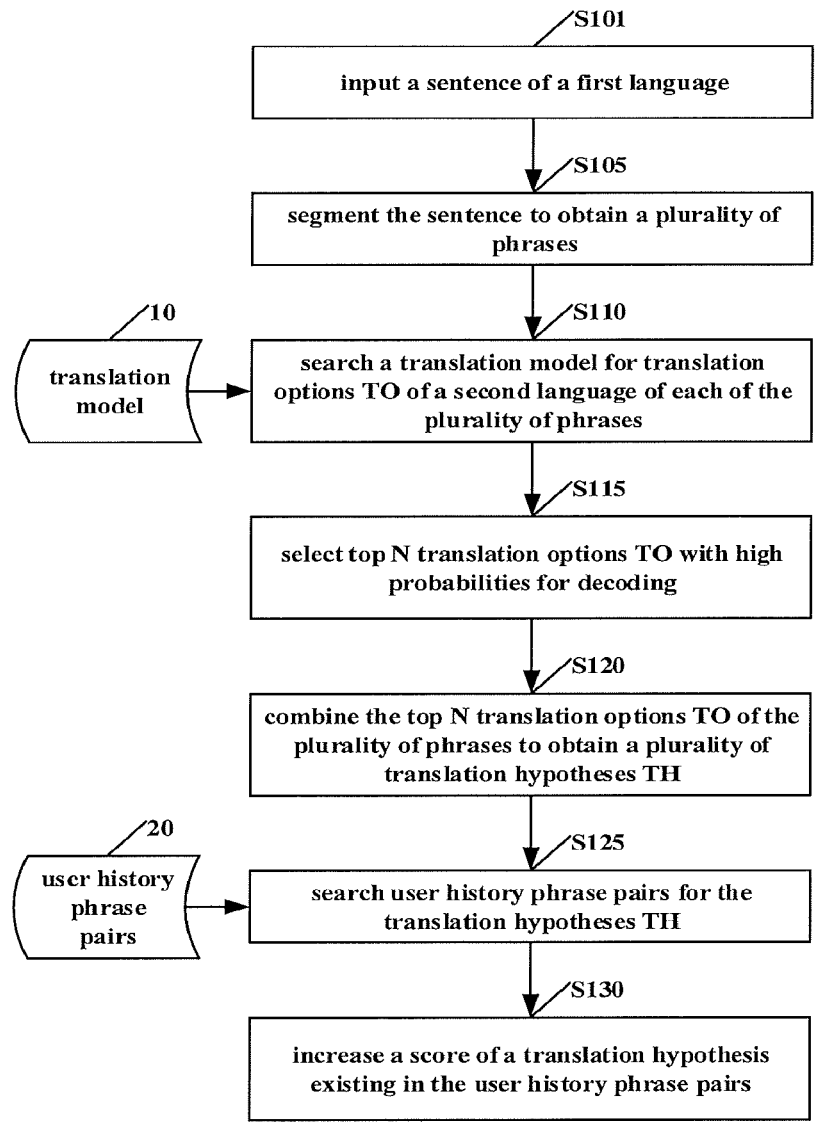
FIG. 1 is a flowchart of a machine translation method according to an embodiment of the present invention.

FIG. 1 is a flowchart of a machine translation method according to an embodiment of the present invention. As shown in FIG. 1, first, in step S101, a sentence of a first language is inputted.

In the embodiment, the sentence of the first language is a sentence to be translated. There is no limitation on the first language, which can be any language such as English, Chinese, German, Japanese etc.

Next, in step S105, the sentence of the first language is segmented to obtain a plurality of phrases. The method of segmenting the sentence can be any method known by those skilled in the art, and the embodiment has no limitation on this.

Next, in step S110, a translation model 10 is searched for translation options (TOs) of a second language of each of the plurality of phrases.

There are bilingual pairs aligned each other of phrases of the first language and phrases of the second language in the translation model 10. In step S110, the translation model 10 is searched for TOs of the second language corresponding to each phrase with respect to each phrase.

Usually, there are a plurality of TOs corresponding to each phrase, and it is assumed that there are T translation options. In the embodiment, in order to decrease computational complexity, in step S115, top N translation options with high probabilities are selected for decoding, wherein N is an integer equal to or larger than 1. That is to say, top N translation options with higher probabilities or with lower costs are selected for the subsequent decoding.

Next, in step S120, the top N translation options of the plurality of phrases are combined to obtain a plurality of translation hypotheses (THs). The method of combining TOs to obtain THs can be any method known by those skilled in the art, and the embodiment has no limitation on this.

Next, in step S125, user history phrase pairs 20 are searched for the translation hypotheses.

In the embodiment, user history phrase pairs are obtained based on user bilingual history documents. Firstly, word-aligned corpus are obtained based on the bilingual history documents by using toolkits of MT, and then the user history phrase pairs are obtained by using a rule of consistent with a word alignment. Usually, a maximum length is set when obtaining phrase pairs. However, in the embodiment, preferably, a maximum length is not set for the user history phrase pairs. The reason of not setting the maximum length is to give bonus to the translation hypotheses in the subsequent step. The translation hypothesis is constituted by many TOs. Although maximum length of each TO is limited, the maximum length of TH is not limited.

Next, in step S130, a score of TH existing in the user history phrase pairs 20 is increased. That is to say, a bonus is given to the TH existing in the user history phrase pairs 20.

In the embodiment, the method of giving bonus to TH can be a method of simply adding the probability of TH and probability of TH in the user history phrase pairs 20, or a method of giving bonus by considering the length of TH. Preferably, the longer the length of TH is, the higher the score of TH is increased, i.e. the bigger the bonus is.

The reason is that when TH is matched with the user history phrase pairs 20, the matching target is a sentence, a phrase or a word and the longer the TH is, the lower the probability of the matching is. Therefore, the longer the matching length is, the more credible the TH is and the bigger the bonus is.

Specifically, preferably, the bonus is given based on the following formula (1):

$$\text{Score(TH)}=\text{Score\_before(TH)} \times \sqrt{\text{Length(TH)}} \qquad (1)$$

wherein Score(TH) is a score after being increased of the translation hypothesis, Score_before(TH) is a score before being increased of the translation hypothesis, and Length (TH) is the length of the translation hypothesis.

Moreover, the probability of TH in the user history phrase pairs 20 can be further considered on the basis of the formula (1). That is to say, the score of TH is increased based on the length of the translation hypothesis and a score of TH in the user history phrase pairs 20.

Specifically, preferably, the bonus is given based on the following formula (2):

$$\text{Score(TH)}=\text{Score\_before(TH)} \times \sqrt{\text{Length(TH)}} \times (1+\text{Score\_in\_UHP(TH)}) \qquad (2)$$

wherein Score(TH) is a score after being increased of the translation hypothesis, Score_before(TH) is a score before being increased of the translation hypothesis, Length(TH) is the length of the translation hypothesis, and Score_in_UHP (TH) is a score of the translation hypothesis in the user history phrase pairs 20.

Through the machine translation method of the embodiment, machine translation quality can be improved effectively and the translation result is more complied with habits of a user by increasing a score of a translation hypothesis existing in the user history phrase pairs by using the user history phrase pairs. At the same time the domain-adaption is realized and machine translation quality is improved effectively without changing the MT model.

Figure 2:
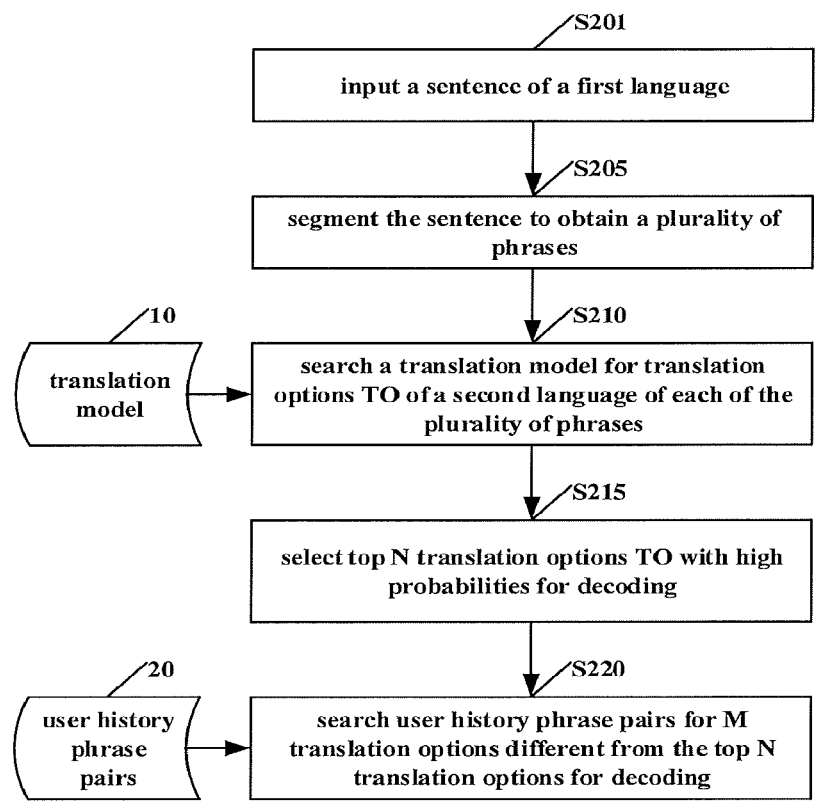
FIG. 2 is a flowchart of a machine translation method according to another embodiment of the present invention.

FIG. 2 is a flowchart of a machine translation method according to another embodiment of the present invention.

As shown in FIG. 2, first, in step S201, a sentence of a first language is inputted.

In the embodiment, the sentence of the first language is same with that of the above embodiment, and the detail description is omitted here.

Next, in step S205, the sentence of the first language is segmented to obtain a plurality of phrases. The method of segmenting the sentence can be any method known by those skilled in the art, and the embodiment has no limitation on this.

Next, in step S210, a translation model 10 is searched for TOs of a second language of each of the plurality of phrases.

There are bilingual pairs aligned each other of phrases of the first language and phrases of the second language in the translation model 10. In step S210, the translation model 10 is searched for TOs of the second language corresponding to each phrase with respect to each phrase.

Usually, there are a plurality of TOs corresponding to each phrase, and it is assumed that there are T translation options. In the embodiment, in order to decrease computational complexity, in step S215, top N translation options with high probabilities are selected for decoding, wherein N is an integer equal to or larger than 1. That is to say, top N translation options with higher probabilities or with lower costs are selected for the subsequent decoding.

Next, in step S220, user history phrase pairs 20 is searched for M translation options different from the top N translation options for decoding, wherein M is an integer equal to or larger than 1.

In the embodiment, the user history phrase pairs 20 are same with that of the above embodiment, and the detail description is omitted here.

In step S215, top N TOs are selected from T TOs. In step S220, preferably, intersection is performed between T-N TOs left which are not selected and the user history phrase pairs 20. It is assumed M intersections are obtained and M TOs and N TOs selected above are used together to participate in the final decoding process.

In the machine translation method of the embodiment, the TOs with low probabilities in translation model but high relevant with UHD are selected to participate in the final decoding process, and thus the probability of obtaining a better translation is increased. The decoding complexity is not influenced since few phrases exist in UHD for the inputting sentence.

That is to say, through the machine translation method of the embodiment, machine translation quality can be improved effectively and the translation result is more complied with habits of an user by making some translation options with low probabilities and no chance to participate in decoding process, but highly relevant with the user participate in the decoding process. At the same time the domain-adaption is realized and machine translation quality is improved effectively without changing the MT model.

Moreover, the machine translation method shown in FIG. 2 and the machine translation method shown in FIG. 1 can be combined. That is to say, after step S220 of the machine translation method shown in FIG. 2, step S120, step S125 and step S130 of the machine translation method shown in FIG. 1 can be performed.

Specifically, after step S220, the top N TOs selected in step S215 and the M TOs searched in step S220 of the plurality of phrases, i.e. N+M TOs are combined to obtain a plurality of THs.

Next, user history phrase pairs 20 are searched for the THs.

Next, a score of TH existing in the user history phrase pairs 20 is increased. That is to say, a bonus is given to the TH existing in the user history phrase pairs 20.

In the embodiment, the method of giving bonus to TH can be a method of simply adding the probability of TH and probability of TH in the user history phrase pairs 20, or a method of giving bonus by considering the length of TH. Preferably, the longer the length of TH is, the higher the score of TH is increased, i.e. the bigger the bonus is.

The reason is that when TH is matched with the user history phrase pairs 20, the matching target is a sentence, a phrase or a word and the longer the TH is, the lower the probability of the matching is. Therefore, the longer the matching length is, the more credible the TH is and the bigger the bonus is.

Specifically, preferably, the bonus is given based on the following formula (1):

$$\text{Score(TH)}=\text{Score\_before(TH)} \times \sqrt{\text{Length(TH)}} \qquad (1)$$

wherein Score(TH) is a score after being increased of the translation hypothesis, Score_before(TH) is a score before being increased of the translation hypothesis, and Length (TH) is the length of the translation hypothesis.

Moreover, the probability of TH in the user history phrase pairs 20 can be further considered on the basis of the formula (1). That is to say, the score of TH is increased based on the length of the translation hypothesis and a score of TH in the user history phrase pairs 20.

Specifically, preferably, the bonus is given based on the following formula (2):

$$Score(TH) = Score\_before(TH) \times \sqrt{Length(TH)} \times (1 + Score\_in\_UHP(TH)) \qquad (2)$$

wherein Score(TH) is a score after being increased of the translation hypothesis, Score_before(TH) is a score before being increased of the translation hypothesis, Length(TH) is the length of the translation hypothesis, and Score_in_UHP(TH) is a score of the translation hypothesis in the user history phrase pairs 20.

Through the machine translation method of the embodiment, machine translation quality can be improved effectively and the translation result is more complied with habits of a user by increasing a score of a translation hypothesis existing in the user history phrase pairs by using the user history phrase pairs. At the same time the domain-adaption is realized and machine translation quality is improved effectively without changing the MT model.

Figure 3:
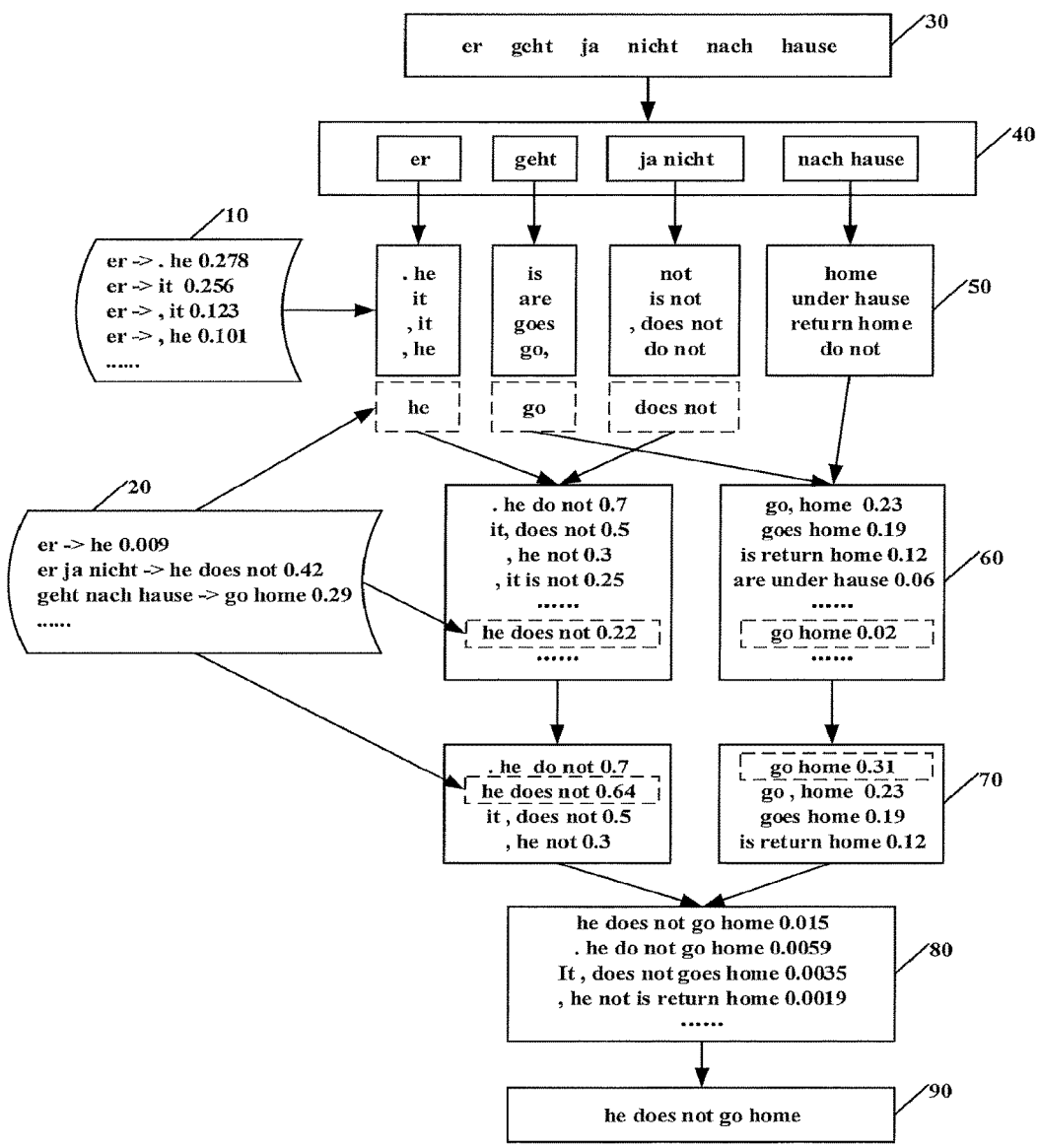
FIG. 3 is a schematic diagram of an example of a machine translation process according to an embodiment of the present invention.

An example of a translation process of the machine translation method will be described with reference to FIG. 3. FIG. 3 is a schematic diagram of an example of a machine translation process according to an embodiment of the present invention.

As shown in FIG. 3, a sentence to be translated 30 is a German sentence "er geht ja nicht nach hause".

In step S205, the German sentence is segmented into a plurality of phrases 40.

In step S210, the translation model 10 is searched for TOs corresponding to each phrase with respect to each phrase. In step S215, Top 4 TOs with high probabilities are selected, the reference number of which is 50 in FIG. 3. Taking phrase "er" as an example, TOs selected are ". he", "it", ", it" and ", he".

Next, in step S220, intersection is performed between TOs which are not selected and the user history phrase pairs 20. For phrases "er", "geht" and "ja nicht", TOs "he", "go" and "does not" corresponding to the phrases, i.e. M TOs are obtained respectively.

Next, in step S120, Top 4 TOs selected and M TOs are combined and a plurality of THs 60 are obtained.

Next, in step S125, the plurality of THs 60 and the user history phrase pairs 20 are matched and two THs "he does not 0.22" and "go home 0.02" existing in the user history phrase pairs 20 are obtained, probabilities of which in the user history phrase pairs 20 are "0.42" and "0.29" respectively.

Next, bonuses are given to the two THs. Here, THs of "he does not 0.64" and "go home 0.31" with bonuses are obtained by simply adding the probabilities of THs and the probabilities of THs in the user history phrase pairs 20, the reference number of which is 70 in FIG. 3.

Next, the plurality of THs are combined to obtain candidate translations 80.

Finally, the candidate translation "he does not go home 0.015" with highest score are selected as the final translation result.

Figure 4:
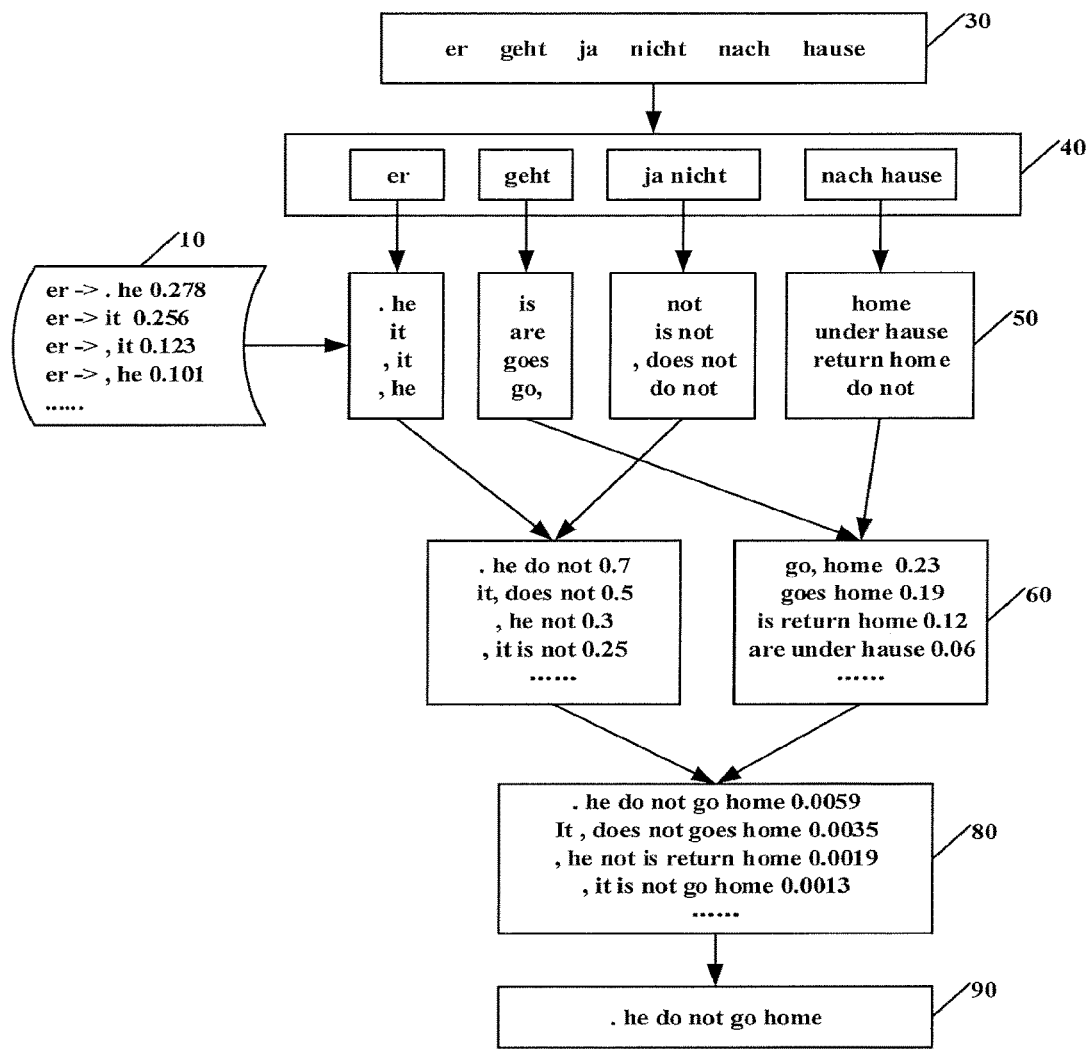
FIG. 4 is a schematic diagram of an example of an existing machine translation process.

An example of a translation process of an existing method will be described with reference to FIG. 4. FIG. 4 is a schematic diagram of an example of an existing machine translation process.

As shown in FIG. 4, after TOs are obtained by using the translation model 10, TOs are not added by using the user history phrase pairs. After THs are obtained, bonus is not given to THs by using the user history phrase pairs. The translation result finally obtained is ". he do not go home 0.0059".

As can be seen from above, the machine translation method of the embodiment, as compared with the existing method of FIG. 4, can effectively improve the machine translation quality by selecting TOs highly relevant with the user history documents for decoding and giving bonus to THs by using the user history phrase pairs, and therefore the translation result with higher quality and more complied with habits of a user is obtained.

<Machine Translation Apparatus>

Figure 5:
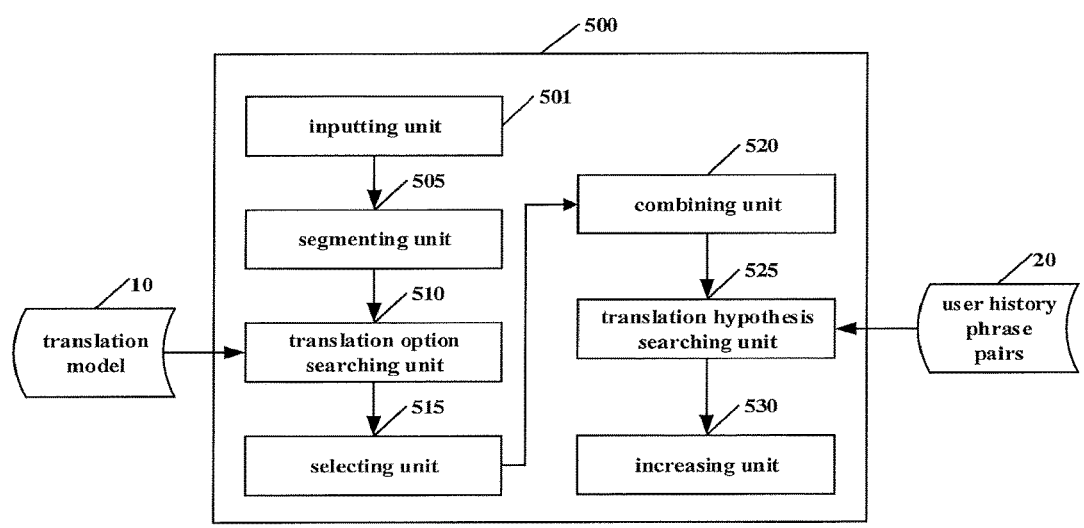
FIG. 5 is a block diagram of a machine translation apparatus according to another embodiment of the present invention.

FIG. 5 is a block diagram of a machine translation apparatus 500 according to another embodiment of the present invention under a same inventive concept. Next, this embodiment will be described in conjunction with that figure. For those same parts as the above embodiments, the description of which will be properly omitted.

The machine translation apparatus 500 of the embodiment comprises an inputting unit 501, a segmenting unit 505, a translation option searching unit 510, a selecting unit 515, a combining unit 520, a translation hypothesis searching unit 525, and an increasing unit 530. The machine translation apparatus 500 can be implemented as a computer device. The computer device reads a program from a memory (not shown in FIG. 5), deploys and executes the program in the memory so that respective functions of the inputting unit 501, the segmenting unit 505, the translation option searching unit 510, the selecting unit 515, the combining unit 520, the translation hypothesis searching unit 525, and the increasing unit 530 can be implemented as a circuitry.

As shown in FIG. 5, a sentence of a first language is inputted by the inputting unit 501.

In the embodiment, the sentence of the first language is a sentence to be translated. There is no limitation on the first language, which can be any language such as English, Chinese, German, Japanese etc.

The sentence of the first language is segmented by the segmenting unit 505 to obtain a plurality of phrases. The method of segmenting the sentence can be any method known by those skilled in the art, and the embodiment has no limitation on this.

A translation model 10 is searched by the translation option searching unit 510 for translation options (TOs) of a second language of each of the plurality of phrases.

There are bilingual pairs aligned each other of phrases of the first language and phrases of the second language in the translation model 10. The translation model 10 is searched by the translation option searching unit 510 for TOs of the second language corresponding to each phrase with respect to each phrase.

Usually, there are a plurality of TOs corresponding to each phrase, and it is assumed that there are T translation options. In the embodiment, in order to decrease computational complexity, top N translation options with high probabilities are selected by the selecting unit 515 for decoding, wherein N is an integer equal to or larger than 1. That is to say, top N translation options with higher probabilities or with lower costs are selected for the subsequent decoding.

The top N translation options of the plurality of phrases are combined by the combining unit 520 to obtain a plurality of translation hypotheses (THs). The method of combining TOs to obtain THs can be any method known by those skilled in the art, and the embodiment has no limitation on this.

User history phrase pairs 20 are searched by the translation hypothesis searching unit 525 for the translation hypotheses.

In the embodiment, user history phrase pairs are obtained based on user bilingual history documents. Firstly, word-aligned corpus are obtained based on the bilingual history documents by using toolkits of MT, and then the user history phrase pairs are obtained by using a rule of consistent with a word alignment. Usually, a maximum length is set when obtaining phrase pairs. However, in the embodiment, preferably, a maximum length is not set for the user history phrase pairs. The reason of not setting the maximum length is to give bonus to the translation hypotheses in the subsequent step. The translation hypothesis is constituted by many TOs. Although maximum length of each TO is limited, the maximum length of TH is not limited.

A score of TH existing in the user history phrase pairs 20 is increased by the increasing unit 530. That is to say, a bonus is given to the TH existing in the user history phrase pairs 20. The score of TH existing in the user history phrase pairs 20 is stored into the memory (not shown in FIG. 5).

In the embodiment, the method of giving bonus to TH can be a method of simply adding the probability of TH and probability of TH in the user history phrase pairs 20, or a method of giving bonus by considering the length of TH. Preferably, the longer the length of TH is, the higher the score of TH is increased, i.e. the bigger the bonus is.

The reason is that when TH is matched with the user history phrase pairs 20, the matching target is a sentence, a phrase or a word and the longer the TH is, the lower the probability of the matching is. Therefore, the longer the matching length is, the more credible the TH is and the bigger the bonus is.

Specifically, preferably, the bonus is given based on the following formula (1):

$$\text{Score(TH)} = \text{Score\_before(TH)} \times \sqrt{\text{Length(TH)}} \quad (1)$$

wherein Score(TH) is a score after being increased of the translation hypothesis, Score_before(TH) is a score before being increased of the translation hypothesis, and Length (TH) is the length of the translation hypothesis.

Moreover, the probability of TH in the user history phrase pairs 20 can be further considered on the basis of the formula (1). That is to say, the score of TH is increased based on the length of the translation hypothesis and a score of TH in the user history phrase pairs 20.

Specifically, preferably, the bonus is given based on the following formula (2):

$$\text{Score(TH)} = \text{Score\_before(TH)} \times \sqrt{\text{Length(TH)}} \times (1 + \text{Score\_in\_UHP(TH)}) \quad (2)$$

wherein Score(TH) is a score after being increased of the translation hypothesis, Score_before(TH) is a score before being increased of the translation hypothesis, Length(TH) is the length of the translation hypothesis, and Score_in_UHP (TH) is a score of the translation hypothesis in the user history phrase pairs.

Through the machine translation apparatus 500 of the embodiment, machine translation quality can be improved effectively and the translation result is more complied with habits of a user by increasing a score of a translation hypothesis existing in the user history phrase pairs by using the user history phrase pairs. At the same time the domain-adaption is realized and machine translation quality is improved effectively without changing the MT model.

Figure 6:
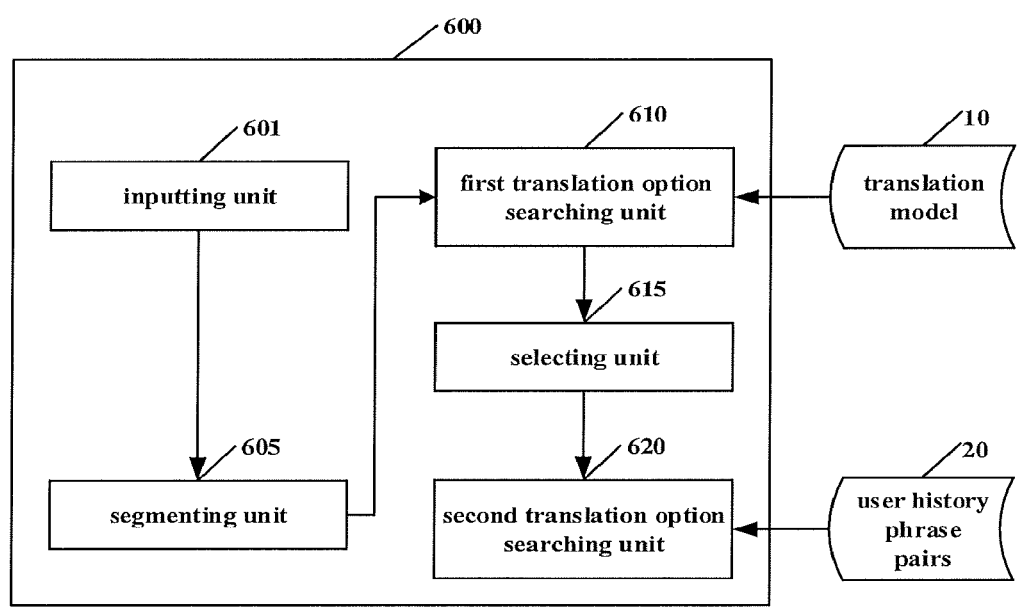
FIG. 6 is a block diagram of a machine translation apparatus according to another embodiment of the present invention.

FIG. 6 is a block diagram of a machine translation apparatus 600 according to another embodiment of the present invention.

The machine translation apparatus 600 of the embodiment comprises an inputting unit 601, a segmenting unit 605, a first translation option searching unit 610, a selecting unit 615, and a second translation option searching unit 620. The machine translation apparatus 600 can be implemented as a computer device. The computer device reads a program from a memory (not shown in FIG. 6), deploys and executes the program in the memory so that respective functions of the inputting unit 601, the segmenting unit 605, the first translation option searching unit 610, the selecting unit 615, and the second translation option searching unit 620 can be implemented as a circuitry.

As shown in FIG. 6, a sentence of a first language is inputted by the inputting unit 601.

In the embodiment, the sentence of the first language is same with that of the above embodiment, and the detail description is omitted here.

The sentence of the first language is segmented by the segmenting unit 605 to obtain a plurality of phrases. The method of segmenting the sentence can be any method known by those skilled in the art, and the embodiment has no limitation on this.

A translation model 10 is searched by the first translation option searching unit 610 for TOs of a second language of each of the plurality of phrases.

There are bilingual pairs aligned each other of phrases of the first language and phrases of the second language in the translation model 10. The translation model 10 is searched by the first translation option searching unit 610 for TOs of the second language corresponding to each phrase with respect to each phrase.

Usually, there are a plurality of TOs corresponding to each phrase, and it is assumed that there are T translation options. In the embodiment, in order to decrease computational complexity, top N translation options with high probabilities are selected by the selecting unit 615 for decoding, wherein N is an integer equal to or larger than 1. That is to say, top N translation options with higher probabilities or with lower costs are selected for the subsequent decoding.

User history phrase pairs 20 is searched by the second translation option searching unit 620 for M translation options different from the top N translation options for decoding, wherein M is an integer equal to or larger than 1. The user history phrase pairs 20 is stored into the memory (not shown in FIG. 6).

In the embodiment, the user history phrase pairs 20 are same with that of the above embodiment, and the detail description is omitted here.

Top N TOs are selected by the selecting unit 615 from T TOs. The second translation option searching unit 620 is preferably configured to perform intersection between T-N TOs left which are not selected and the user history phrase pairs 20. It is assumed M intersections are obtained and M TOs and N TOs selected above are used together to participate in the final decoding process.

In the machine translation apparatus 600 of the embodiment, the TOs with low probabilities in translation model but high relevant with UHD are selected to participate in the final decoding process, and thus the probability of obtaining a better translation is increased. The decoding complexity is not influenced since few phrases exist in UHD for the inputting sentence.

That is to say, through the machine translation apparatus 600 of the embodiment, machine translation quality can be improved effectively and the translation result is more complied with habits of an user by making some translation options with low probabilities and no chance to participate in decoding process, but highly relevant with the user participate in the decoding process. At the same time the domain-adaption is realized and machine translation quality is improved effectively without changing the MT model.

Moreover, the machine translation apparatus shown in FIG. 5 and the machine translation apparatus shown in FIG. 6 can be combined. That is to say, the machine translation apparatus shown in FIG. 6 can further comprises the combining unit 520, the translation hypothesis searching unit 525 and the increasing unit 530 of the machine translation apparatus shown in FIG. 5.

Specifically, the top N TOs selected by the selecting unit 615 and the M TOs searched by the second translation option searching unit 620 of the plurality of phrases, i.e. N+M TOs are combined to obtain a plurality of THs.

User history phrase pairs 20 are searched by the translation hypothesis searching unit 525 for the THs.

A score of TH existing in the user history phrase pairs 20 is increased by the increasing unit 530. That is to say, a bonus is given to the TH existing in the user history phrase pairs 20.

In the embodiment, the method of giving bonus to TH can be a method of simply adding the probability of TH and probability of TH in the user history phrase pairs 20, or a method of giving bonus by considering the length of TH. Preferably, the longer the length of TH is, the higher the score of TH is increased, i.e. the bigger the bonus is.

The reason is that when TH is matched with the user history phrase pairs 20, the matching target is a sentence, a phrase or a word and the longer the TH is, the lower the probability of the matching is. Therefore, the longer the matching length is, the more credible the TH is and the bigger the bonus is.

Specifically, preferably, the bonus is given based on the following formula (1):

$$\text{Score(TH)} = \text{Score\_before(TH)} \times \sqrt{\text{Length(TH)}} \quad (1)$$

wherein Score(TH) is a score after being increased of the translation hypothesis, Score_before(TH) is a score before being increased of the translation hypothesis, and Length (TH) is the length of the translation hypothesis.

Moreover, the probability of TH in the user history phrase pairs 20 can be further considered on the basis of the formula (1). That is to say, the score of TH is increased based on the length of the translation hypothesis and a score of TH in the user history phrase pairs 20.

Specifically, preferably, the bonus is given based on the following formula (2):

$$\text{Score(TH)} = \text{Score\_before(TH)} \times \sqrt{\text{Length(TH)}} \times (1 + \text{Score\_in\_UHP(TH)}) \quad (2)$$

wherein Score(TH) is a score after being increased of the translation hypothesis, Score_before(TH) is a score before being increased of the translation hypothesis, Length(TH) is the length of the translation hypothesis, and Score_in_UHP (TH) is a score of the translation hypothesis in the user history phrase pairs.

Through the machine translation apparatus of the embodiment, machine translation quality can be improved effectively and the translation result is more complied with habits of a user by increasing a score of a translation hypothesis existing in the user history phrase pairs by using the user history phrase pairs. At the same time the domain-adaption is realized and machine translation quality is improved effectively without changing the MT model.

An example of a translation process of the machine translation apparatus will be described with reference to FIG. 3. FIG. 3 is a schematic diagram of an example of a machine translation process according to an embodiment of the present invention.

As shown in FIG. 3, a sentence to be translated 30 is a German sentence "er geht ja nicht nach hause".

The German sentence is segmented by the segmenting unit 605 into a plurality of phrases 40.

The translation model 10 is searched by the first translation option searching unit 610 for TOs corresponding to each phrase with respect to each phrase. Top 4 TOs with high probabilities are selected by the selecting unit 615, the reference number of which is 50 in FIG. 3. Taking phrase "er" as an example, TOs selected are ". he", "it", ", it" and ", he".

Intersection is performed by the second translation option searching unit 620 between TOs which are not selected and the user history phrase pairs 20. For phrases "er", "geht" and "ja nicht", TOs "he", "go" and "does not" corresponding to the phrases, i.e. M TOs are obtained respectively.

Top 4 TOs selected and M TOs are combined by the combining unit 520 and a plurality of THs 60 are obtained.

The plurality of THs 60 and the user history phrase pairs 20 are matched by the translation hypothesis searching unit 525 and two THs "he does not 0.22" and "go home 0.02" existing in the user history phrase pairs 20 are obtained, probabilities of which in the user history phrase pairs 20 are "0.42" and "0.29" respectively.

Bonuses are given by the increasing unit 530 to the two THs. Here, THs of "he does not 0.64" and "go home 0.31" with bonuses are obtained by simply adding the probabilities of THs and the probabilities of THs in the user history phrase pairs 20, the reference number of which is 70 in FIG. 3.

Next, the plurality of THs are combined to obtain candidate translations 80.

Finally, the candidate translation "he does not go home 0.015" with highest score are selected as the final translation result.

An example of a translation process of an existing apparatus will be described with reference to FIG. 4. FIG. 4 is a schematic diagram of an example of an existing machine translation process.

As shown in FIG. 4, after TOs are obtained by using the translation model 10, TOs are not added by using the user history phrase pairs. After THs are obtained, bonus is not given to THs by using the user history phrase pairs. The translation result finally obtained is ". he do not go home 0.0059".

As can be seen from above, the machine translation apparatus of the embodiment, as compared with the existing method of FIG. 4, can effectively improve the machine translation quality by selecting TOs highly relevant with the user history documents for decoding and giving bonus to THs by using the user history phrase pairs, and therefore the translation result with higher quality and more complied with habits of a user is obtained.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machine translation apparatus, comprising:
a circuitry configured to
input a sentence of a first language,
segment the sentence to obtain a plurality of phrases,
search a translation model for translation options of a second language of each of the plurality of phrases,
select top N translation options with high probabilities for decoding, wherein N is an integer equal to or larger than 1,
combine the top N translation options of the plurality of phases to obtain a plurality of translation hypotheses,
search user history phrase pairs for the translation hypotheses, and
increase a score of a translation hypothesis existing in the user history phrase pairs; and
a memory configured to store the score of the translation hypothesis;
wherein,
the longer the length of the translation hypothesis is, the higher the score of the translation hypothesis is increased.

2. The machine translation apparatus according to claim 1, wherein
the circuitry is configured to increase the score of the translation hypothesis based on the following formula (1):

$$\text{Score(TH)} = \text{Score\_before(TH)} \times \sqrt{\text{Length(TH)}} \quad (1)$$

wherein Score(TH) is a score after being increased of the translation hypothesis, Score_before(TH) is a score before being increased of the translation hypothesis, and Length(TH) is the length of the translation hypothesis.

3. The machine translation apparatus according to claim 1, wherein
the circuitry is configured to increase the score of the translation hypothesis, based on the length of the translation hypothesis and a score of the translation hypothesis in the user history phrase pairs.

4. The machine translation apparatus according to claim 3, wherein
the circuitry is configured to increase a score of a translation hypothesis based on the following formula (2):

$$\text{Score(TH)} = \text{Score\_before(TH)} \times \sqrt{\text{Length(TH)}} \times (1 + \text{Score\_in\_UHP(TH)}) \quad (2)$$

wherein Score(TH) is a score after being increased of the translation hypothesis, Score_before(TH) is a score before being increased of the translation hypothesis, Length(TH) is the length of the translation hypothesis, and Score_in_UHP(TH) is a score of the translation hypothesis in the user history phrase pairs.

5. A machine translation apparatus, comprising:
a circuitry configured to
input a sentence of a first language,
segment the sentence to obtain a plurality of phrases,
search a translation model for translation options of a second language of each of the plurality of phrases,
select top N translation options with high probabilities for decoding, wherein N is an integer equal to or larger than 1, and
search user history phrase pairs for M translation options different from the top N translation options for decoding, wherein M is an integer equal to or larger than 1; and
a memory configured to store the user history phrase pairs;
wherein
the circuitry is configured to
combine the top N translation options and the M translation options of the plurality of phrases to obtain a plurality of translation hypotheses,
search user history phrase pairs for the translation hypotheses, and
increase a score of a translation hypothesis existing in the user history phrase pairs.

6. The machine translation apparatus according to claim 5, wherein
the circuitry is configured to perform intersection between the user history phrase pairs and unselected translation options of the translation options.

7. The machine translation apparatus according to claim 5, wherein,
the longer the length of the translation hypothesis is, the higher the score of the translation hypothesis is increased.

8. The machine translation apparatus according to claim 7, wherein
the circuitry is configured to increase a score of a translation hypothesis based on the following formula (1):

$$\text{Score(TH)} = \text{Score\_before(TH)} \times \sqrt{\text{Length(TH)}} \quad (1)$$

wherein Score(TH) is a score after being increased of the translation hypothesis, Score_before(TH) is a score before being increased of the translation hypothesis, and Length(TH) is the length of the translation hypothesis.

9. The machine translation apparatus according to claim 5, wherein
the circuitry is configured to increase the score of the translation hypothesis, based on the length of the translation hypothesis and a score of the translation hypothesis in the user history phrase pairs.

10. The machine translation apparatus according to claim 9, wherein
the circuitry is configured to increase a score of a translation hypothesis based on the following formula (2):

$$\text{Score(TH)} = \text{Score\_before(TH)} \times \sqrt{\text{Length(TH)}} \times (1 + \text{Score\_in\_UHP(TH)}) \quad (2)$$

wherein Score(TH) is a score after being increased of the translation hypothesis, Score_before(TH) is a score before being increased of the translation hypothesis, Length(TH) is the length of the translation hypothesis, and Score_in_UHP(TH) is a score of the translation hypothesis in the user history phrase pairs.

11. A machine translation method applied to a circuitry using a memory, comprising:
inputting by the circuitry, a sentence of a first language;
segmenting by the circuitry, the sentence to obtain a plurality of phrases;
searching by the circuitry, a translation model for translation options of a second language of each of the plurality of phrases;
selecting by the circuitry, top N translation options with high probabilities for decoding, wherein N is an integer equal to or larger than 1;
combining by the circuitry, the top N translation options of the plurality of phrases to obtain a plurality of translation hypotheses;
searching by the circuitry, user history phrase pairs for the translation hypotheses;
increasing by the circuitry, a score of a translation hypothesis existing in the user history phrase pairs, wherein the longer the length of the translation hypothesis is, the higher the score of the translation hypothesis is increased; and storing by the circuitry, the score of the translation hypothesis into the memory.

12. A machine translation method applied to a circuitry using a memory, comprising:

inputting by the circuitry, a sentence of a first language;

segmenting by the circuitry, the sentence to obtain a plurality of phrases;

searching by the circuitry, a translation model for translation options of a second language of each of the plurality of phrases;

selecting by the circuitry, top N translation options with high probabilities for decoding, wherein N is an integer equal to or larger than 1;

searching by the circuitry, user history phrase pairs for M translation options different from the top N translation options for decoding, wherein M is an integer equal to or larger than 1;

combining the top N translation options and the M translation options of the plurality of phrases to obtain a plurality of translation hypotheses;

searching user history phrase pairs for the translation hypotheses; and increasing a score of a translation hypothesis existing in the user history phrase pairs; and storing by the circuitry, the user history phrase pairs into the memory.

* * * * *